US009961059B2

(12) United States Patent
Azulay et al.

(10) Patent No.: US 9,961,059 B2
(45) Date of Patent: May 1, 2018

(54) AUTHENTICATOR PLUGIN INTERFACE

(71) Applicant: Red Hat Israel, Ltd., Raanana (IL)

(72) Inventors: Barak Azulay, Nes-Ziona (IL); Alon Bar-Lev, Raanana (IL); Ravi Nori, Raanana (IL)

(73) Assignee: RED HAT ISRAEL, LTD., Raanana (IL)

( * ) Notice: Subject to any disclaimer, the term of this patent is extended or adjusted under 35 U.S.C. 154(b) by 133 days.

(21) Appl. No.: 14/632,594

(22) Filed: Feb. 26, 2015

(65) Prior Publication Data

US 2016/0014196 A1 Jan. 14, 2016

Related U.S. Application Data

(60) Provisional application No. 62/022,921, filed on Jul. 10, 2014.

(51) Int. Cl.
*H04L 29/06* (2006.01)
*G06F 21/31* (2013.01)

(52) U.S. Cl.
CPC ............. *H04L 63/08* (2013.01); *G06F 21/31* (2013.01)

(58) Field of Classification Search
CPC ..... G06F 9/45558; G06F 21/31; H04L 63/08; H04L 67/10
USPC .......................................... 726/3, 4, 5; 718/1
See application file for complete search history.

(56) References Cited

U.S. PATENT DOCUMENTS

| 5,341,466 | A | * | 8/1994 | Perlin | G06T 3/0025 |
| | | | | | 345/428 |
| 5,774,551 | A | | 6/1998 | Wu et al. | |
| 5,915,021 | A | * | 6/1999 | Herlin | G06Q 20/3674 |
| | | | | | 380/247 |
| 6,253,163 | B1 | * | 6/2001 | Lapie | G06Q 20/341 |
| | | | | | 235/380 |

(Continued)

FOREIGN PATENT DOCUMENTS

WO  WO 2007057610 A1 * 5/2007 ........... H04L 9/3247

OTHER PUBLICATIONS

Dong, "Protecting Sensitive Web Content from Client-side Vulnerabilities with CRYPTONS", CCS'12, Nov. 4-8, 2013, pp. 1311-1324.*

(Continued)

*Primary Examiner* — Luu T Pham
*Assistant Examiner* — Walter J Malinowski
(74) *Attorney, Agent, or Firm* — Womble Bond Dickinson (US) LLP; Daniel E. Ovanezian

(57) ABSTRACT

Authenticator plugin interface for an enterprise virtualization portal is provided. An example method for evaluating a portal access request may comprise: receiving, by a virtualization management platform, a request initiated by a requestor for access to an enterprise virtualization portal associated with the virtualization management platform, the request comprising a login credential; transmitting, to a first external authentication system, a first authentication query comprising an identifier of a first data type, and a first value of the first data type, wherein the first value is derived from the login credential; receiving a first response message comprising an identifier of a second data type, and an authentication response of the second data type; and responsive to evaluating the authentication response, granting the requestor access to the enterprise virtualization portal.

14 Claims, 7 Drawing Sheets

(56) References Cited

U.S. PATENT DOCUMENTS

| | | | |
|---|---|---|---|
| 6,651,168 B1 | 11/2003 | Kao et al. | |
| 6,781,986 B1* | 8/2004 | Sabaa | H04L 12/5693 370/389 |
| 6,950,935 B1 | 9/2005 | Allavarpu et al. | |
| 6,954,792 B2 | 10/2005 | Kang et al. | |
| 7,194,763 B2* | 3/2007 | Potter | H04L 63/08 380/247 |
| 7,228,417 B2* | 6/2007 | Roskind | G06F 21/31 380/255 |
| 7,243,230 B2* | 7/2007 | England | G06F 21/606 380/201 |
| 7,243,369 B2 | 7/2007 | Bhat et al. | |
| 7,310,307 B1* | 12/2007 | Das | H04L 12/66 370/229 |
| 7,386,122 B1* | 6/2008 | Guillou | H04L 9/3218 380/30 |
| 7,406,510 B1* | 7/2008 | Feldman | H04L 63/083 709/201 |
| 7,519,813 B1* | 4/2009 | Cox | G06F 21/33 713/165 |
| 7,591,005 B1 | 9/2009 | Moore | |
| 7,716,723 B1* | 5/2010 | Taylor | H04L 63/08 380/273 |
| 8,332,848 B2* | 12/2012 | Azulay | G06F 8/65 717/168 |
| 8,429,675 B1* | 4/2013 | Radhakrishnan | G06F 9/45533 719/319 |
| 8,447,983 B1* | 5/2013 | Beck | H04L 9/0894 705/65 |
| 8,849,978 B1* | 9/2014 | Batson | H04L 67/10 709/223 |
| 8,908,863 B2* | 12/2014 | Chen | 380/270 |
| 8,924,960 B2* | 12/2014 | Louzoun | H04L 67/1002 718/1 |
| 9,317,189 B1* | 4/2016 | Chen | G06F 3/0484 |
| 9,361,366 B1* | 6/2016 | Yancey | G06F 17/30699 |
| 9,619,633 B1* | 4/2017 | Mortensen | G06F 21/32 |
| 2002/0138565 A1* | 9/2002 | Kustov | H04L 29/06 709/203 |
| 2002/0165912 A1* | 11/2002 | Wenocur | G06Q 10/107 709/203 |
| 2002/0198733 A1* | 12/2002 | Sawa | G06Q 30/02 705/1.1 |
| 2003/0009271 A1* | 1/2003 | Akiyama | G06F 21/335 701/29.6 |
| 2003/0033545 A1* | 2/2003 | Wenisch | G06F 21/31 726/3 |
| 2003/0070069 A1 | 4/2003 | Belapurkar et al. | |
| 2004/0025020 A1* | 2/2004 | Yoshimura | H04L 63/0428 713/169 |
| 2004/0034502 A1* | 2/2004 | Jung | H04L 63/08 702/178 |
| 2004/0078371 A1* | 4/2004 | Worrall | G06F 17/30873 |
| 2004/0225603 A1* | 11/2004 | Allen | G06Q 20/10 705/39 |
| 2004/0243853 A1* | 12/2004 | Swander | H04L 63/0236 726/14 |
| 2005/0015293 A1* | 1/2005 | Henn | G06Q 10/06311 705/7.13 |
| 2005/0131997 A1* | 6/2005 | Lewis | G06F 21/552 709/203 |
| 2005/0228675 A1* | 10/2005 | Trinkel | G06F 21/32 704/270 |
| 2005/0262550 A1* | 11/2005 | Torii | G06F 21/34 726/2 |
| 2006/0072517 A1* | 4/2006 | Barrow | H04W 8/06 370/335 |
| 2006/0205388 A1* | 9/2006 | Semple | H04L 63/0853 455/411 |
| 2006/0276137 A1* | 12/2006 | Pummill | H04W 92/14 455/67.11 |
| 2007/0150940 A1* | 6/2007 | Gilek | G06F 21/6245 726/4 |
| 2007/0157078 A1* | 7/2007 | Anderson | G06F 17/227 715/207 |
| 2007/0171921 A1* | 7/2007 | Wookey | G06F 3/1415 370/401 |
| 2007/0180503 A1* | 8/2007 | Li | H04L 63/06 726/5 |
| 2007/0192599 A1* | 8/2007 | Kato | H04L 9/0844 713/168 |
| 2007/0300067 A1* | 12/2007 | Robertson | G06F 17/30011 713/176 |
| 2008/0034425 A1* | 2/2008 | Overcash | G06F 21/55 726/22 |
| 2008/0114985 A1* | 5/2008 | Savagaonkar | G06F 21/57 713/176 |
| 2008/0148376 A1* | 6/2008 | Onozawa | G06F 21/41 726/8 |
| 2008/0162926 A1* | 7/2008 | Xiong | G06F 21/445 713/155 |
| 2008/0163073 A1* | 7/2008 | Becker | G06Q 30/00 715/753 |
| 2008/0228854 A1* | 9/2008 | Grimault | H04L 12/2805 709/201 |
| 2009/0158034 A1* | 6/2009 | Gu | H04L 63/08 713/156 |
| 2009/0164564 A1* | 6/2009 | Willis | G06F 17/30884 709/203 |
| 2009/0210925 A1* | 8/2009 | Ogata | G06F 21/31 726/2 |
| 2009/0235074 A1* | 9/2009 | Salgarelli | G06F 21/34 713/169 |
| 2010/0017845 A1* | 1/2010 | Jones | G06F 21/32 726/1 |
| 2010/0037127 A1* | 2/2010 | Tomasic | G06Q 10/06 715/224 |
| 2010/0037296 A1* | 2/2010 | Silverstone | G06F 21/53 726/3 |
| 2010/0037301 A1* | 2/2010 | Jones | H04L 63/08 726/5 |
| 2010/0071035 A1* | 3/2010 | Budko | H04L 63/08 726/4 |
| 2010/0131654 A1* | 5/2010 | Malakapalli | H04L 67/08 709/227 |
| 2010/0146606 A1* | 6/2010 | Delia | G06F 21/32 726/7 |
| 2010/0281273 A1* | 11/2010 | Lee | G06F 21/72 713/190 |
| 2011/0004878 A1* | 1/2011 | Divoux | G06F 9/4856 718/1 |
| 2011/0004918 A1* | 1/2011 | Chow | H04L 63/08 726/3 |
| 2011/0041166 A1* | 2/2011 | Mani | G06F 21/31 726/6 |
| 2011/0041171 A1* | 2/2011 | Burch | H04L 63/08 726/7 |
| 2011/0047606 A1* | 2/2011 | Blomquist | G06F 21/41 726/7 |
| 2011/0047608 A1* | 2/2011 | Levenberg | H04L 63/0807 726/7 |
| 2011/0067095 A1* | 3/2011 | Leicher | H04L 63/06 726/10 |
| 2011/0119474 A1* | 5/2011 | Singh | G06F 8/65 713/2 |
| 2011/0131572 A1* | 6/2011 | Elyashev | G06F 9/45533 718/1 |
| 2011/0197270 A1* | 8/2011 | Kaufman | G06F 21/32 726/7 |
| 2011/0246786 A1* | 10/2011 | Laor | G06F 21/6227 713/189 |
| 2011/0289575 A1* | 11/2011 | Shi | G06F 17/30867 726/8 |
| 2011/0296489 A1* | 12/2011 | Fernandez Alonso | H04L 63/08 726/1 |
| 2011/0296510 A1* | 12/2011 | Hatlelid | G06F 21/6218 726/7 |

(56) References Cited

U.S. PATENT DOCUMENTS

| | | | |
|---|---|---|---|
| 2012/0066679 A1* | 3/2012 | Pappas | G06F 9/45558 718/1 |
| 2012/0117381 A1* | 5/2012 | Lo | G06F 8/63 713/156 |
| 2012/0159469 A1* | 6/2012 | Laor | G06F 9/4555 717/173 |
| 2012/0192253 A1* | 7/2012 | Betsch | G06F 21/31 726/4 |
| 2012/0201381 A1* | 8/2012 | Miller | H04L 9/16 380/255 |
| 2012/0210011 A1* | 8/2012 | Liu | H04L 63/10 709/229 |
| 2012/0216289 A1* | 8/2012 | Kawaguchi | G06F 21/10 726/26 |
| 2012/0227098 A1* | 9/2012 | Obasanjo | H04L 63/0815 726/8 |
| 2012/0246334 A1* | 9/2012 | Yang | H04L 69/08 709/232 |
| 2012/0254155 A1* | 10/2012 | Heim | G06F 17/30979 707/721 |
| 2012/0280790 A1* | 11/2012 | Gerhardt | G07C 9/00309 340/5.61 |
| 2012/0281708 A1* | 11/2012 | Chauhan | H04L 63/0272 370/401 |
| 2012/0290702 A1* | 11/2012 | Vincent | G06F 9/45558 709/223 |
| 2012/0317630 A1* | 12/2012 | Goldberg | H04L 9/3215 726/7 |
| 2013/0045726 A1* | 2/2013 | Stalnaker | H04W 4/16 455/415 |
| 2013/0097688 A1* | 4/2013 | Bradley, II | G06F 21/6218 726/9 |
| 2013/0155876 A1* | 6/2013 | Potra | H04W 36/14 370/248 |
| 2013/0239106 A1* | 9/2013 | Srinivasan | G06F 9/45558 718/1 |
| 2013/0254852 A1* | 9/2013 | Islam | H04L 63/0815 726/4 |
| 2013/0262626 A1* | 10/2013 | Bozek | H04L 67/10 709/217 |
| 2013/0275973 A1* | 10/2013 | Greenfield | G06F 9/44584 718/1 |
| 2013/0276070 A1* | 10/2013 | Lee | G06F 21/31 726/4 |
| 2013/0318595 A1* | 11/2013 | Wang | G06F 9/45558 726/16 |
| 2013/0325505 A1* | 12/2013 | Vengco | G06F 19/322 705/3 |
| 2014/0068718 A1* | 3/2014 | Mureinik | G06F 21/604 726/4 |
| 2014/0098957 A1* | 4/2014 | Larsson | H04L 63/08 380/270 |
| 2014/0157385 A1* | 6/2014 | Kuegler | H04L 9/0844 726/7 |
| 2014/0157434 A1* | 6/2014 | Graves | H04L 63/101 726/28 |
| 2014/0189804 A1* | 7/2014 | Lehmann | H04L 63/105 726/4 |
| 2014/0208401 A1* | 7/2014 | Balakrishnan | H04L 63/08 726/5 |
| 2014/0230024 A1* | 8/2014 | Uehara | H04L 63/1433 726/4 |
| 2014/0282965 A1* | 9/2014 | Sambamurthy | G06F 21/32 726/7 |
| 2014/0330799 A1* | 11/2014 | White | G06F 17/30371 707/694 |
| 2014/0337930 A1* | 11/2014 | Hoyos | H04L 63/10 726/4 |
| 2015/0058930 A1* | 2/2015 | Mitchell | G06F 21/41 726/3 |
| 2015/0120529 A1* | 4/2015 | Faaborg | G06Q 10/083 705/39 |
| 2015/0135294 A1* | 5/2015 | Du | G06F 21/33 726/7 |
| 2015/0202532 A1* | 7/2015 | Takeuchi | A63F 13/79 463/42 |
| 2015/0213460 A1* | 7/2015 | Anderson | G06Q 50/20 705/318 |
| 2015/0235215 A1* | 8/2015 | Kumar | G06Q 20/4014 705/44 |
| 2015/0244696 A1* | 8/2015 | Ma | H04L 63/08 726/4 |
| 2015/0254094 A1* | 9/2015 | Cao | G06F 9/45558 718/1 |
| 2015/0310205 A1* | 10/2015 | Pruthi | G06F 21/46 726/25 |
| 2015/0381442 A1* | 12/2015 | Delgado | H04L 43/065 713/168 |

OTHER PUBLICATIONS

Kasper, "Subscriber Authentication in mobile cellular Networks with virtual software SIM Credentials using Trusted Computing", Conference: Advanced Communications Technology, 2008, ICACT 2008, 10th International Conference on, vol. 2, 7 pages.*

Kerr, "PEAR: A Hardware Based Protocol Authentication System", SPRINGL '10, Nov. 2, 2010, 8 pages.*

Draft IEEE Standard for Local and metropolitan area networks, "Corrigendum to IEEE Standard to Local and Metropolitan Area Networks—Part 16: Air Interface for Fixed Broadband Wireless Access Systems", 2005, IEEE, May 21, 2005, 240 pages.*

Li, "CloudVO: Building a Secure Virtual Organization for Multiple Clouds Collaboration", 2010 11th ACIS International Conference on Software Engineering, Artificial Intelligence, Networking and Parallel/ Distributed Computing, IEEE Computer Society, 2010, pp. 181-186.*

Humphrey, "CloudDRN: A Lightweight, End-to-End System for Sharing Distributed Research Data in the Cloud", 2013 IEEE 95h International Conference on e-Science, IEEE Computer Society, 2013, pp. 254-261.*

Duggan, "Service-Oriented Architecture", Enterprise Software Architecture and Design Entities, Services, and Resources, Wiley-IEEE Press eBook Chapters, 2012, pp. 207-358. (Year: 2012).*

Chen, "VICSDA: Using Virtual Communities to Secure Service Discovery and Access", Qshine'07, Aug. 14-17, 2007, 7pages. (Year: 2007).*

Samar, Vipin, "Unified Login with Pluggable Authentication Modules (PAM)", SunSoft, Inc., ACM, Inc. Conference, Mar. 1996 pp. 1-10 http://www.cs.fsu.edu/~breno/CIS-5930/references/p1-samar.pdf.

Samur, Vipin et al., "Making Login Services Independent of Authentication Technologies", SunSoft, Inc., 3rd ACM, Inc. Conference Mar. 1996, 10 pages http://www.unix-edu.se/share/security/auth/pam_external.pdf.

Geisshirt, Kenneth, "Pluggable Authentication Modules The Definitive Guide to PAM for Linux SysAdmins and C Developers", Packt Publishing Ltd,, Birmingham, UK, Jan. 2007, 118 pages http://ebooks.shahed.biz/OS/LINUX/Geisshirt%20K.Pluggable%20 Authentication%20Modules.Packt.%5BENG, 118p.,2007%5D.pdf.

Itoi, Naomaru et al., "Pluggable Authentication Modules for Windows NT", Proceedings of the 2nd USENIX Windows NT Symposium, Seattle, WA, Aug. 2-4, 1998, 12 pages http://static.usenix.org/legacy/publications/library/proceedings/usenix-nt98/full_papers/itoi/itoi.pdf.

* cited by examiner

AUTHENTICATOR PLUGIN INTERFACE

CROSS-REFERENCE TO RELATED APPLICATIONS

This application claims the benefit of U.S. Provisional Application No. 62/022,921 filed Jul. 10, 2014, entitled "Authenticator Plugin Interface," which is incorporated herein by reference in its entirety.

TECHNICAL FIELD

This disclosure relates to the field of virtualization and, in particular, to the provision of an authenticator plugin interface.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines.

An enterprise virtualization management platform may provide common underlying services and management technologies for virtualization workloads. One or more portals may be associated with such a platform, including, e.g., an admin portal, a user portal, a reports dashboard, etc.

BRIEF DESCRIPTION OF THE DRAWINGS

The present disclosure is illustrated by way of example, and not by way of limitation, in the Figures of the accompanying drawings.

DETAILED DESCRIPTION

Within a virtualization environment, a virtualization management platform may provide one or more user portals. Such portals may include a portal which allows for system administrator-orientated management operations, a portal which allows for end user-orientated management operations, and/or a portal which allows for virtual machine (VM) access. A user logging into such a portal may be requested to provide one or more credentials (e.g., a user name, a password, and/or a smartcard).

Before granting the user access to the portal, the virtualization management platform may authenticate a user by validating the login credentials against a certain authentication system. In common implementations, the virtualization management platform is limited to employing one or more authentication systems supporting a certain authentication protocol.

Aspects of the present disclosure address the above noted and other deficiencies by providing an authenticator plugin interface allowing a virtualization management platform to perform user authentication against one or more of a plurality of external authentication systems. The authenticator plugin interface provides a run-time binding between the virtualization management platform and each of the external authentication systems, without requiring either component's awareness of the other component's architecture or other implementation details, thus effectively decoupling the virtualization management platform from the authentication system.

In certain implementations, interaction between the virtualization management platform and the authentication system may involve exchange of messages comprising one or more key-value pairs (also referred herein as "tuples"), thus providing an open-ended application level protocol that allows for future extensions without modifying the existing code or data.

Various aspects of the above referenced methods and systems are described in details herein below by way of examples, rather than by way of limitation. The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example-only details and still be contemplated to be within the scope of the present disclosure.

Figure 1:
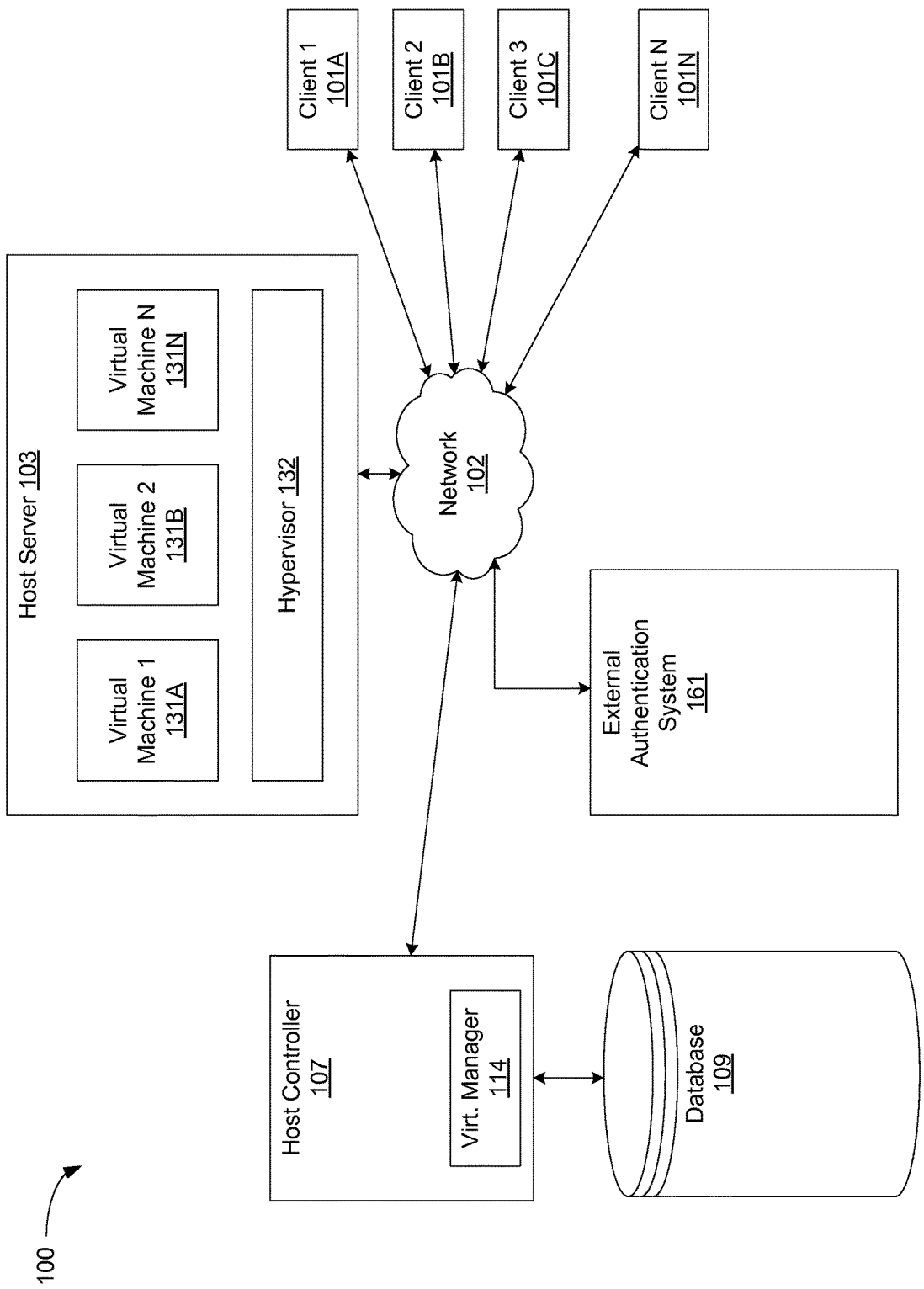
FIG. 1 illustrates an example network architecture, in accordance with one or more aspects of the present disclosure

FIG. 1 illustrates an example network architecture 100 in which examples of the present disclosure may operate. The network architecture 100 includes one or more host servers 103 coupled to clients 101A-101N over a network 102. The network 102 may comprise one or more public and/or private networks (e.g., local area networks (LANs) and/or wide area networks (WANs)). The host servers 103 may also be coupled to a host controller 107 (via the same or a different network or directly). Host controller 107 may be an independent machine such as a server computer, a desktop computer, a virtual machine, etc. Alternatively, host controller 107 may be part of the host servers 103. In one example, the network architecture 100, including host controller 107, host servers 103 and clients 101A-101N, may be referred to as a virtualization environment.

The network architecture also includes one or more external authentication providers 161 coupled over network 102. External authentication provider 161 may be an independent machine such as a server computer, a desktop computer, etc. Alternatively, external provider 161 may be part of host servers 103 and/or part of the host controllers

107. External authentication provider 161 may include external authentication system 161.

In one example, clients 101A-101N may include computing devices that have a wide range of processing capabilities. Some or all clients 101A-101N may be thin clients, which serve as access terminals for users and depend primarily on the host servers 103 for processing activities. For example, client 101A may be a desktop computer, laptop computer, cellular phone, personal digital assistant (PDA), etc. Clients 101A-101N may run client applications such as a web browser. Clients 101A-101N may also run other client applications, which receive multimedia data streams or other data from host server 103 and re-direct the received data to a local display or other user interface.

Host servers 103 may include server computers or any other computing devices capable of running one or more virtual machines 131A-131N. Each virtual machine 131 runs a guest operating system (OS) that may be different from one virtual machine to another. The guest OS may include Microsoft Windows, Linux, Solaris, OS X, etc. The host server 103 may include a hypervisor 132 that abstracts the underlying hardware platform for the virtual machines 131. The hypervisor 132 may also be known as a virtual machine monitor (VMM) or a kernel-based hypervisor.

In an illustrative example, each virtual machine 131 can be accessed by one or more clients 101A-101N over network 102 and can provide a virtual desktop for one or more clients 101A-101N. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

Virtual machines 131A-131N may be managed by the host controller 107. Host controller 107 may manage the allocation of resources to virtual machines 131A-131N. In addition, host controller may monitor the status of virtual machines 131A-131N as well as the progress of commands and processes being executed by virtual machines 131A-131N and/or on virtual machines 131. Host controller 107 may include a virtualization management platform 114 to perform management operations in the virtualization system, including for example allocating resources of host servers 103 to virtual machines 131A-131N, monitoring the status of virtual machines 131A-131N, monitoring the progress of commands and processes being executed by virtual machines 131A-131N, etc. Host controller 107 may also maintain a management database 109 used by the virtualization management platform 114 for the above referenced management operations.

As discussed in greater detail herein below, user interface of virtualization management platform 114 may comprise one or more portals, including a user portal, an administrative portal, a reporting dashboard, etc. Virtualization management platform 114 may process user login requests received through one of the portals, and may grant or deny user access to a portal based on the result of authenticating the user against an external authentication system 161.

As discussed in greater detail herein below, external authentication system 161 may perform operations including receiving authentication queries from virtualization management platform 114, validating login credentials, and sending authentication replies to virtualization management platform 114.

Figure 2:
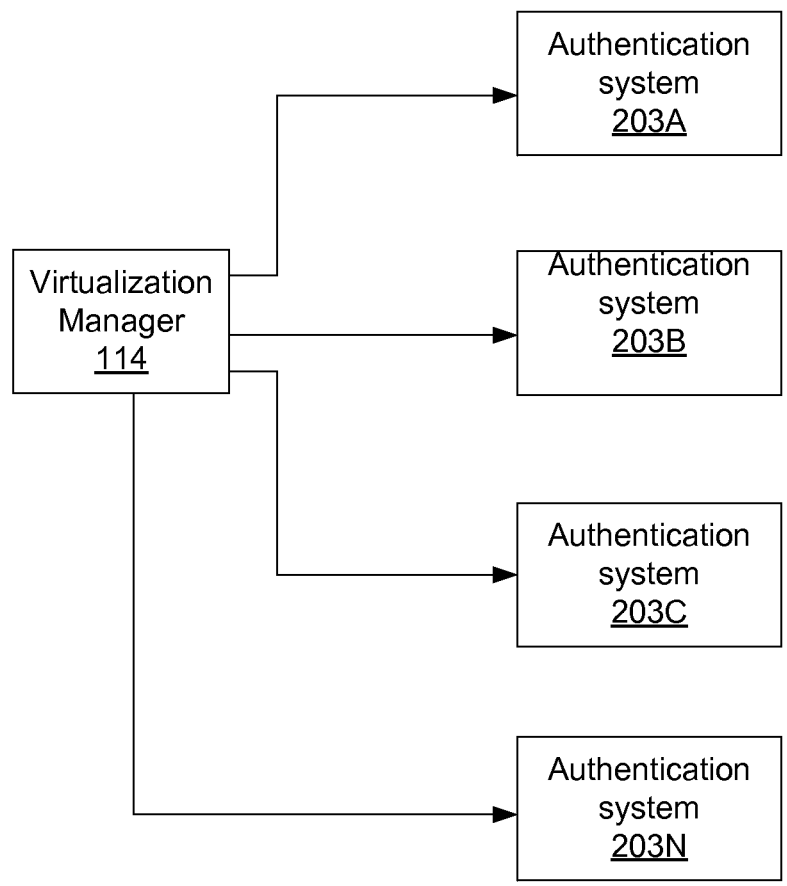
FIG. 2 illustrates external authenticator plugin architecture, in accordance with one or more aspects of the present disclosure.

FIG. 2 illustrates one example of external authenticator plugin architecture. Shown in FIG. 2 are virtualization management platform 114 and authentication interface plugins 203A-203N that may be deployed by virtualization management platform 114 on one or more computing devices and may be configured to communicate with one or more external authentication systems 161 via a common authentication interface.

The common authentication interface may involve exchange of messages comprising one or more key-value pairs (also referred herein as "tuples"). Each external authentication system 161 may implement one or more authentication protocols, such as OpenID, Keystone, Lightweight Directory Access Protocol (LDAP), and/or a custom authentication protocol.

In certain implementations, the key element of a key-value pair may comprise a unique identifier (e.g., a Universally Unique Identifier (UUID) or other universally unique identifier), an identifier of the data type (e.g., a Java data type such as a string, character, integer, floating point, Boolean, or byte) of the value element. Without limitation, such a key-value pair may in the following description be referred to as a 3-touple (triplet) comprising a unique identifier, a data type identifier, and a value of the identified data time.

In certain implementations, an authentication request may comprise two key-value pairs representing a user identifier and a hashed user password, and the corresponding authentication response may comprise a single key-value pair representing the authentication result.

In an illustrative example, the virtualization management platform may receive a login request with respect to an enterprise virtualization portal associated with the virtualization management platform. Responsive to receiving a request, the virtualization management platform may transmit, to the external authentication system, an authentication query comprising a unique identifier, a data type identifier, and a value derived from the login credential that was supplied by the login request. The external authentication system may reply by a response message comprising a unique identifier, a data type identifier, and an authentication response. Based on evaluating the authentication response, the virtualization management platform may grant or deny the user access to the enterprise virtualization portal.

In certain implementations, the virtualization management platform may be configured to perform a chain authentication. In an illustrative example, responsive to receiving a login request, the virtualization management system may sequentially transmit two or more user authentication requests to two or more authentication systems supporting different authentication types. The second and subsequent authentication request of the series is only transmitted responsive to receiving a successful authentication response to the previous authentication request. The sequence may be aborted responsive to receiving an authentication failure response at any stage. The user may be successfully authenticated responsive to receiving successful authentication responses to all authentication requests in the series.

Figure 3A:
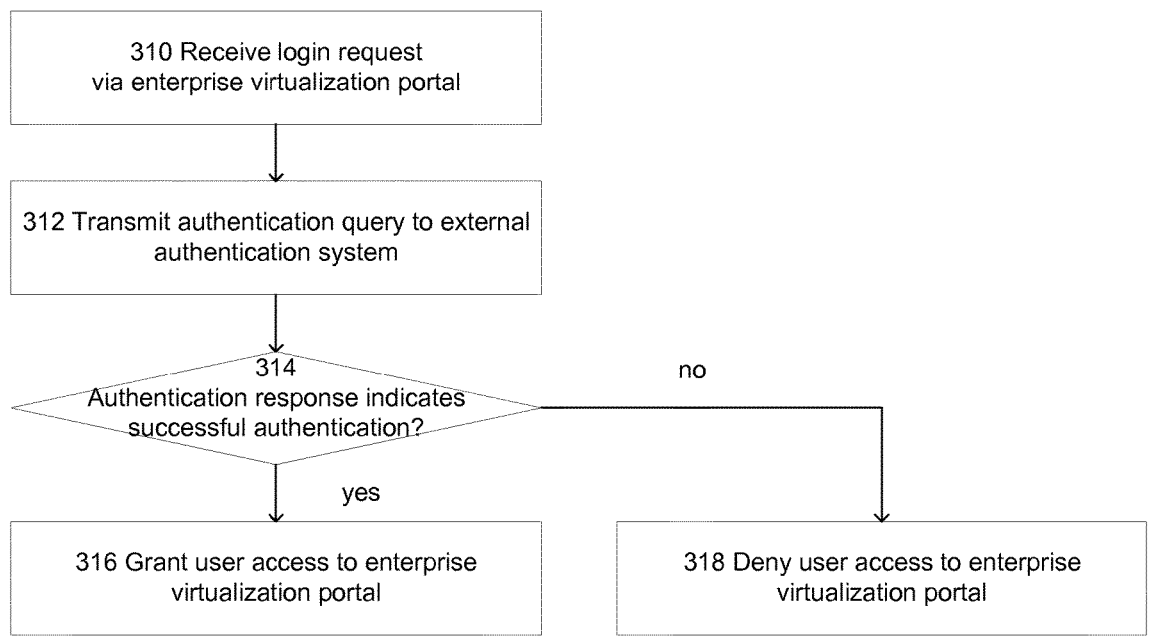
FIGS. 3A-3C represent flow diagrams illustrating example methods of employ of an external authenticator, in accordance with one or more aspects of the present disclosure.

FIG. 3A illustrates a flow diagram of an example method of validating an enterprise virtualization portal login request by an external authenticator (e.g., external authentication system 161). The method may be performed by processing logic that comprises hardware (e.g., circuitry, dedicated logic, programmable logic, microcode, etc.), software (such as instructions run on a processing device), or a combination thereof. As one example, the method may be performed by a virtualization management platform running on a computing device. For instance, the method may be performed by virtualization management platform 114 running on host controller 107.

Referring to FIG. 3A, at block 310 the processing device implementing the method may receive a login request with respect to an enterprise virtualization portal.

At block 312, the processing device may transmit, to an external authentication system, an authentication query comprising a unique identifier, a data type identifier, and a value derived from the login credential that was supplied by the login request.

At block 314, the processing device may analyze the response received from the external authentication system. The response message may comprise a unique identifier, a data type identifier, and an authentication response. Responsive to determining that the authentication response indicated a successful authentication, the processing may continue at block 316. Otherwise, the method may branch to block 318.

At block 316, the processing device may grant the user access to the enterprise virtualization portal, and the method may terminate.

At block 318, the processing device may deny the user access to the enterprise virtualization portal, and the method may terminate.

Figure 3B:
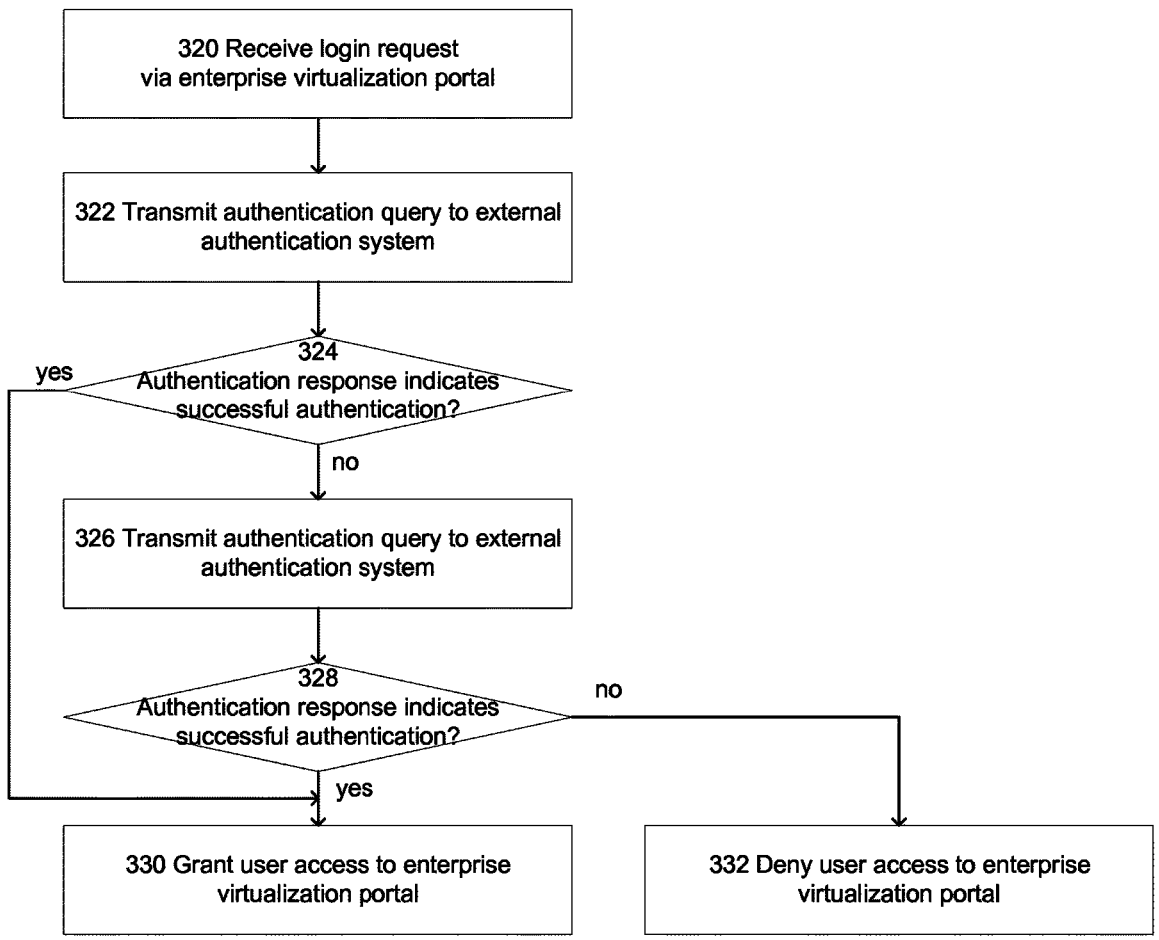

FIG. 3B illustrates a flow diagram of example method of validating an enterprise virtualization portal login request by performing a chain authentication against two or more external authenticators. The method may be performed by processing logic that comprises hardware (e.g., circuitry, dedicated logic, programmable logic, microcode, etc.), software (such as instructions run on a processing device), or a combination thereof. As one example, the method may be performed by a virtualization management platform running on a computing device. For instance, the method may be performed by virtualization management platform 114 running on host controller 107.

Referring to FIG. 3B, at block 320 the processing device implementing the method may receive a login request with respect to an enterprise virtualization portal.

At block 322, the processing device may transmit, to a first external authentication system, an authentication query comprising a unique identifier, a data type identifier, and a value derived from the login credential that was supplied by the login request.

At block 324, the processing device may analyze the response received from the first external authentication system. The response message may comprise a unique identifier, a data type identifier, and an authentication response. Responsive to determining that the response indicated a successful authentication, the method may branch to block 330. Otherwise, the processing may continue at block 326.

At block 326, the processing device may transmit, to a second external authentication system, an authentication query comprising a unique identifier, a data type identifier, and a value derived from the login credential that was supplied by the login request. As noted herein above, the first authentication system and the second authentication system may implement different authentication methods.

At block 328, the processing device may analyze the response received from the second external authentication system. The response message may comprise a unique identifier, a data type identifier, and an authentication response. Responsive to determining that the response indicated a successful authentication, the processing may continue at block 330. Otherwise, the method may branch to block 332.

At block 330, the processing device may grant the user access to the enterprise virtualization portal, and the method may terminate.

At block 332, the processing device may deny the user access to the enterprise virtualization portal, and the method may terminate.

Figure 3C:
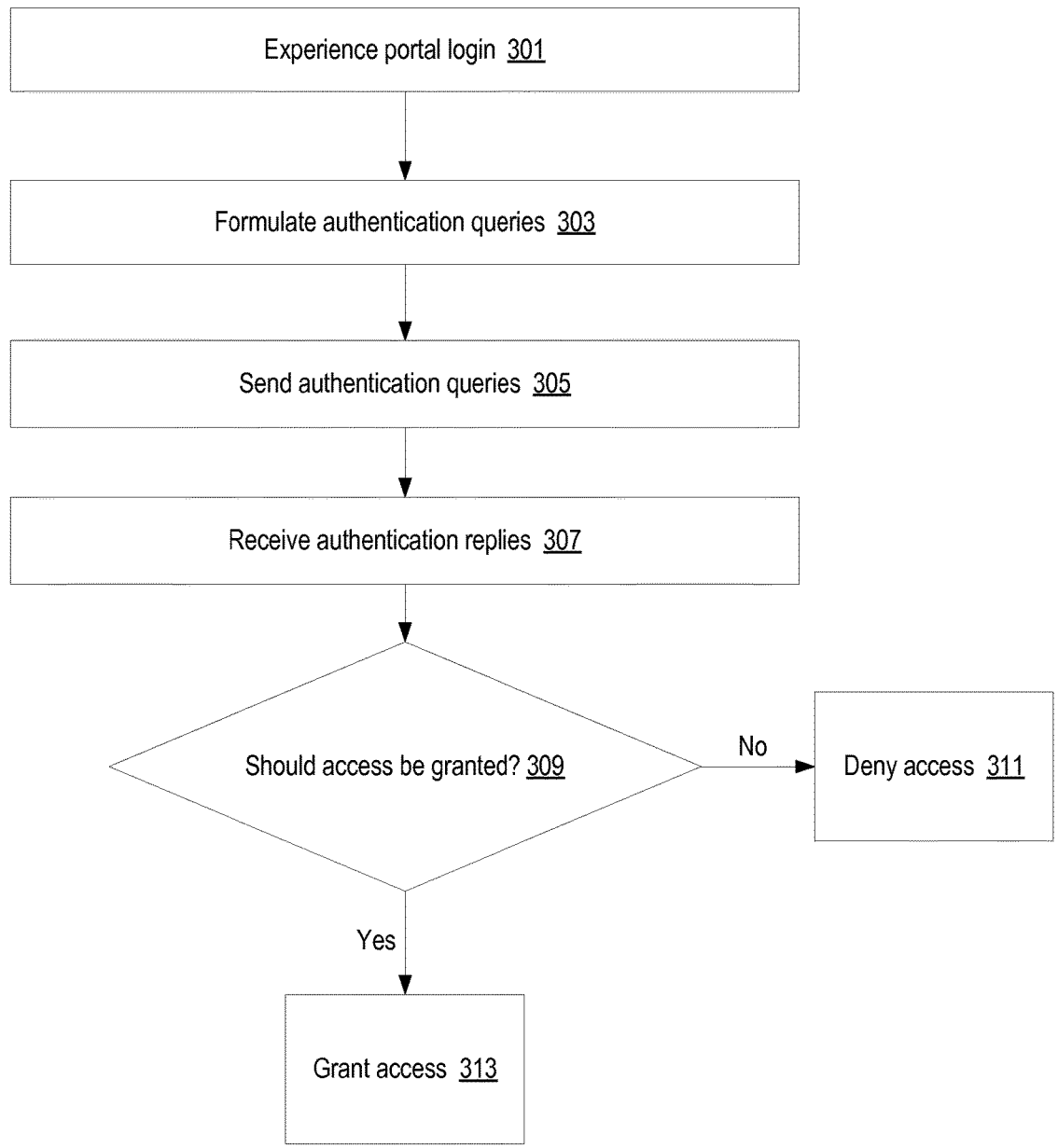

FIG. 3C illustrates a flow diagram of yet another example of a method of employ of an external authenticator (e.g., external authentication system 161). The method may be performed by processing logic that comprises hardware (e.g., circuitry, dedicated logic, programmable logic, microcode, etc.), software (such as instructions run on a processing device), or a combination thereof. As one example, the method may be performed by a virtualization management platform running on a computing device. For instance, the method may be performed by virtualization management platform 114 running on host controller 107.

Referring to FIG. 3C, at block 301 the processing logic may experience a user login to a portal. The portal login may correspond to login to a system administrator-oriented management portal, an end user-oriented management portal, and/or a virtual machine (VM) access portal.

The system administrator-oriented management portal may provide functionality including allowing a system administrator to perform configuration of host servers (e.g., of host server 103), configuration of VMs (e.g., of a VM 131), configuration of storage (e.g., of storage holding VM images, storage holding OS install images, and/or storage holding user data), and/or configuration of networking (e.g., of VM networks allowing for access to VMs and/or communication among VMs, storage networks allowing for access to storage servers and/or other storage, and/or management networks allowing for carriage of configuration-oriented traffic between virtualization management platforms and hypervisors).

The end user-oriented management portal may provide functionality including allowing an end user to perform setting of end user preferences (e.g., relating to VM and/or storage use). The VM access portal may provide functionality including allowing for user access to VMs in order to enjoy, say, desktops, software, and/or services provided by those VMs.

The login to the portal may involve the user providing one or more login credentials. As such, the user may provide a user name, provide a password, present a proximity or non-proximity smartcard to a smartcard reader, provide a numerical value or other data generated by a cryptographic fob or other cryptographic device, and/or provide biometric input—say fingerprint or voice—via employ of a biometric reader. It is noted that the portal login may involve single factor or multifactor authentication. It is further noted that an encrypted channel (e.g., Secure Shell (SSH), Secure Sockets Layer (SSL), or Transport Layer Security (TLS)) may be employed in communications between the processing logic and external authenticators. It is additionally noted that inter-process communication (e.g., via Simple Object Access Protocol (SOAP) or eXtensible Markup Language-Remote Procedure Call (XML-RPC)) may be employed in communications between the processing logic and external authenticators.

Being in possession of the user's login credentials, the processing logic may be configured to validate the login credentials by sequentially transmitting one or more authentication queries to one or more external authenticators. When one of the external authenticators indicate login credential acceptance, the processing logic may conclude that the user should be granted access. In pursuit of this the processing logic may, at block 303, formulate one or more authentication queries. Via such authentication queries, the processing logic may make a given external authenticator aware of the login credentials. As one example, the processing logic might also via such authentication queries convey to the authenticator the tenor of the portal login (e.g., login to a system administrator-oriented management portal). As another example, the processing logic might not convey tenor. Such authentication query formulation may, in one aspect, involve the processing logic constructing one or more variable tuples.

The tenor of the portal login may, for instance, be set forth in terms of an pre-established numerical code and/or textual code which is understood by both the processing logic and the authenticator (e.g., a code decided upon in advance such during a configuration operation, and/or in agreement with a set standard). As one illustration, an integer numerical code might be employed in which "1" indicates login to a system administrator-oriented management portal, "2" indicates login to an end user-oriented management portal, and "3" indicates login to a virtual machine (VM) access portal. As another illustration, a string-based textual code might be employed in which "sysadmin" indicates login to a system administrator-oriented management portal, "endusr" indicates login to an end user-oriented management portal, and "vm" indicates login to a virtual machine (VM) access portal. Tenor may, for instance, be set forth in a non-reestablished fashion. As one illustration, the processing logic might be able to set forth any string textual description which one might envision as conveying to a human reader the at-hand tenor—say any of "system administrator," "administrator portal," or "a sysadmin is logging in" in the case of a system administrator-oriented management portal—with the authenticator employing linguistic analysis to determine the at-hand tenor.

As an authentication query formulation example, suppose that the at-hand login credentials are a user name and a password. The processing logic may construct a variable tuple for the user name and a variable tuple for the password. The variable tuple for the user name may include a first unique identifier, indicate a data type of string, and include a value which sets forth the user name as a string. With reference to that which is discussed hereinabove, the processing logic may in constructing the user name variable tuple establish a corresponding local variable. The variable tuple for the password may, in like vein, include a second unique identifier, indicate a data type of string, and include a value which sets forth the password as a string. With reference to that which is discussed hereinabove, the processing logic may in constructing the password variable tuple establish a corresponding local variable.

Where portal tenor is to be conveyed, the processing logic may further construct a variable tuple for the tenor. As one example, where tenor is to be conveyed via an integer numerical code, the variable tuple for the tenor may include a third unique identifier, indicate a data type of integer, and include a value which sets forth the numerical code as an integer. As another example, where tenor is to be conveyed via a string textual code, the variable tuple for the tenor may include a third unique identifier, indicate a data type of string, and include a value which sets forth the textual code as a string. As a further example, where tenor is to be conveyed in a non-pre-established fashion, the variable tuple for the tenor may include a third unique identifier, include a type of string, and include a value which sets forth, as a string, a textual description which one might envision conveying the at-hand tenor. With reference to that which is discussed hereinabove, the processing logic may in constructing the portal login tenor variable tuple establish a corresponding local variable.

As such, the formulated authentication query may include the user name variable tuple, the password variable tuple and, where tenor is to be conveyed, the tenor variable tuple. Having formulated the one or more authentication queries, the processing logic may, at block 305, send the authentication queries to a given external authenticator. The sending operation may involve the processing logic and the external authenticator employing an encrypted channel and/or various inter-process communication methods.

At block 307 the processing logic may receive one or more authentication replies from the authenticator. The receiving operation may involve the processing logic and the external authenticator employing an encrypted channel and/or various inter-process communication methods. The authentication replies may be made up of one or more variable tuples. Such a variable tuple may be made up of a unique identifier, an indication of a data type, and a value which is of the data type. The authentication reply variable tuples may include one or more variable tuples which indicate whether or not the login credentials are acceptable (e.g., a variable tuple including a unique identifier, indicating a data type of Boolean, and including a value which sets forth, as a Boolean, whether or not the login credentials are acceptable).

In connection with receiving such an authentication reply variable tuple, the processing logic may, in line with that which is discussed hereinabove, establish with respect to the received variable tuple a corresponding local variable. For example, in the case of an authentication reply variable tuple including a unique identifier, indicating a data type of Boolean, and including a value which sets forth, as a Boolean, whether or not the login credentials are acceptable, the corresponding local variable may be a variable of type Boolean which holds the Boolean value indicated by the variable tuple, and the processing logic may associate (e.g., via an array) this local variable with the universal identified set forth by the variable tuple.

The establishment of a local variable corresponding to a variable tuple may involve the processing logic associating the local variable with the unique identifier set forth by the variable tuple. In keeping with this the processing logic may, in connection with receiving an authentication reply variable tuple, check whether or not local variable establishment has been performed with respect to the variable tuple. The processing logic may do so by checking held association between unique identifiers set forth by variable tuples and corresponding local variables (e.g., the processing logic may check an array of the sort discussed above). The processing logic may establish the local variable where the check finds that no corresponding local variable has already been established. Where the check finds that a corresponding local variable has already been established, local variable establishment might not occur, and instead the already-existing local variable may be employed.

At block 309, the processing logic may determine whether or not the user should be granted access. The processing logic may examine the local variables corresponding to the authentication reply variable tuples. For instance, continuing with the above example, the processing logic may check the Boolean value of the local variable to see whether or the login credentials have been found to be acceptable (e.g., whether a Boolean true or a Boolean false is set forth). Where the local variables corresponding to the authentication reply variable tuples indicate that the login credentials have been found to be acceptable, the processing logic may conclude that the user should be granted access. Where the local variables corresponding to the authentication reply variable tuples indicate that the login credentials have been found to be unacceptable, the processing logic may conclude that the user should not be granted access.

Where the examination indicates that the user should not be granted portal access, the processing logic may proceed to block 311 and act to deny the user the portal access for which login occurred. As such the processing logic may (e.g., via a user interface) indicate portal access denial and/or disallow the user's performance of operations which call for successful portal login. Where the examination indicates that the user should be granted portal access, the processing logic may proceed to block 313 and act to grant the user the portal access for which login occurred. As such the processing logic may (e.g., via a user interface) indicate portal access grant and/or allow the user's performance of operations which call for successful portal login.

As noted, portal login may correspond to login to a system administrator-oriented management portal, an end user-oriented management portal, and/or a virtual machine (VM) access portal. Suppose, for instance, that the at-hand login is to a system administrator-oriented management portal. As also noted, the system administrator-oriented management portal may provide functionality including allowing for configuration of host servers, VMs, storage, and networking.

As such, where the examination indicates that the user should be denied system administrator-oriented management portal access, the processing logic may indicate (e.g., via a user interface) the system administrator-oriented management portal access denial and/or disallow the user's performance of operations which call for successful system administrator-oriented management portal login (e.g., the user may be disallowed from configuring host servers, VMs, storage, or networking).

Further, where the examination indicates that the user should be granted system administrator-oriented management portal access, the processing logic may indicate (e.g., via a user interface) the system administrator-oriented management portal access grant and/or allow the user's performance of operations which call for successful system administrator-oriented management portal login (e.g., the user may be permitted to configuration host servers, VMs, storage, and/or networking).

According to an example the processing logic, when in possession of the login credentials, may endeavor to learn from multiple external authenticators whether or not the login credentials are acceptable. The processing logic may, in line with that which is discussed hereinabove, send the formulated authentication queries to multiple external authenticators. The processing logic may, for instance, conclude that the user should be granted access in the case where at least one of the multiple external authenticators indicates login credential acceptance. The processing logic may, for instance, conclude that the user should be granted access in the case where all of the multiple external authenticators indicate login credential acceptance, and conclude that the user should be denied access in the case where fewer than all of the multiple external authenticators indicate login credential acceptance.

Figure 4:
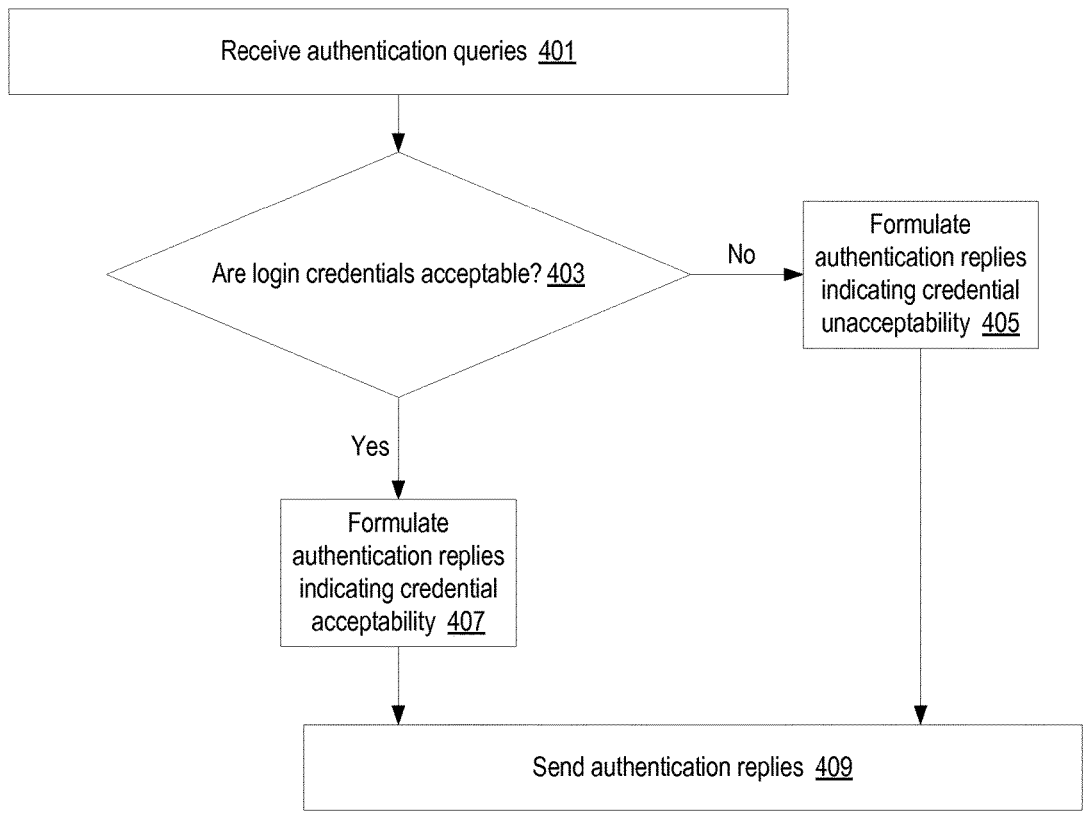
FIG. 4 is a flow diagram illustrating a method of authentication query handling, in accordance with one or more aspects of the present disclosure.

FIG. 4 illustrates a flow diagram of one example of a method of authentication query handling. The method may be performed by processing logic that comprises hardware (e.g., circuitry, dedicated logic, programmable logic, microcode, etc.), software (such as instructions run on a processing device), or a combination thereof. As one example, the method may be performed by an external authenticator running on a computing device. For instance, the method may be performed by external authentication system 161 running on external authentication provider 161.

Referring to FIG. 4, at block 401 the processing logic may receive from a virtualization management platform one or more authentication queries. The receiving operation may involve the processing logic and the virtualization management platform employing an encrypted channel and/or various inter-process communication methods. The authentication queries may be made up of one or more variable tuples. Such a variable tuple may be made up of a unique identifier, an indication of a data type, and a value which is of the data type.

As an example, suppose that the at-hand login credentials are a user name and a password. The authentication queries may include a variable tuple for the user name and a variable tuple for the password. The variable tuple for the user name may include a first unique identifier, indicate a data type of string, and include a value which sets forth the user name as a string. The variable tuple for the password may include a second unique identifier, indicate a data type of string, and include a value which sets forth the password as a string.

Where portal tenor is to be conveyed, the authentication queries may further include a variable tuple for the tenor. As one example where tenor is to be conveyed and where conveyance is via an integer numerical code—say an integer numerical code as discussed hereinabove in connection with FIG. 3C—the variable tuple for the tenor may include a third unique identifier, indicate a data type of integer, and include a value which sets forth the numerical code as an integer. As an example where tenor is to be conveyed and where conveyance is via a string textual code—say a string textual code as discussed hereinabove in connection with FIG. 3C—the variable tuple for the tenor may include a third unique identifier, indicate a data type of string, and include a value which sets forth the textual code as a string. As an example where tenor is to be conveyed and where conveyance is in a non-pre-established fashion—say via a string textual description as discussed hereinabove in connection with FIG. 3C—the variable tuple for the tenor may include a third unique identifier, include a type of string, and include a value which sets forth, as a string, the textual description.

As such, the received authentication query may include the user name variable tuple, the password variable tuple and, where tenor is to be conveyed, the tenor variable tuple. In connection with receiving such an authentication query variable tuple, the processing logic may, in line with that which is discussed hereinabove, establish with respect to the received variable tuple a corresponding local variable. For example, in the case of an authentication query variable tuple including a unique identifier, indicating a data type of string, and including a value which sets forth, as a string, the at-hand user name, the corresponding local variable may be a variable of type string which holds the string value indicated by the variable tuple, and the processing logic may associate (e.g., via an array) this local variable with the universal identified set forth by the variable tuple. As another example, in the case of an authentication query variable tuple including a unique identifier, indicating a data type of string, and including a value which sets forth, as a string, the at-hand password, the corresponding local variable may be a variable of type string which holds the string value indicated by the variable tuple, and the processing logic may associate (e.g., via an array) this local variable with the universal identified set forth by the variable tuple.

The establishment of a local variable corresponding to a variable tuple may involve the processing logic associating the local variable with the unique identifier set forth by the variable tuple. In keeping with this the processing logic may, in connection with receiving an authentication query variable tuple, check whether or not local variable establishment has been performed with respect to the variable tuple. The processing logic may do so by checking held association between unique identifiers set forth by variable tuples and corresponding local variables (e.g., the processing logic may check an array of the sort discussed above). The processing logic may establish the local variable where the check finds that no corresponding local variable has already been established. Where the check finds that a corresponding local variable has already been established, local variable establishment might not occur, and instead the already-existing local variable may be employed.

At block 403, the processing logic may determine whether or not the login credentials received via the authentication queries are acceptable. The processing logic may do so by considering the received logic credentials relative to an accessible store. Where the received authentication queries convey tenor, the processing logic may further consider the tenor relative to the store.

For instance, where the at-hand login credentials are user name and password, the processing logic may consider the user name and password relative to the store in order to determine whether or not the store sets forth a user name-password correlation indicating there to be a user with the received user name whose password is the received password. Where the received authentication queries convey tenor, the processing logic may take the received tenor into account. Suppose, for example that the at-hand login credentials are user name and password, and that the authentication queries further convey tenor. The processing logic may consider the user name, password, and tenor relative to the store in order to determine whether or not the store sets forth a user name-password-tenor correlation indicating there to be a user with the received user name whose password is the received password, and who is entitled to perform a login of the sort indicated by the tenor (e.g., entitled to perform a login to the system administrator-oriented management portal where the tenor indicates an administrator-oriented management portal login).

Having determined whether or not the login credentials received via the authentication queries are acceptable, the processing logic may proceed to block 405 where the login credentials are found to be unacceptable, and to block 407 where the logic credentials are found to be acceptable.

At block 405 the processing logic may formulate one or more authentication replies indicating login credential unacceptability. The authentication reply formulation may, in one aspect, involve the processing logic constructing one or more variable tuples. Such a variable tuple may be made up of a unique identifier, an indication of a data type, and a value which is of the data type. The authentication reply variable tuples may include one or more variable tuples which indicate login credential unacceptability (e.g., a variable tuple including a unique identifier, indicating a data type of Boolean, and including a value which sets forth, as a Boolean, that the login credentials are unacceptable). With reference to that which is discussed hereinabove, the processing logic may in constructing the credential unacceptability variable tuple establish a corresponding local variable.

At block 407 the processing logic may formulate one or more authentication replies indicating login credential acceptability. The authentication reply formulation may, in one aspect, involve the processing logic constructing one or more variable tuples. Such a variable tuple may be made up of a unique identifier, an indication of a data type, and a value which is of the data type. The authentication reply variable tuples may include one or more variable tuples which indicate login credential acceptability (e.g., a variable tuple including a unique identifier, indicating a data type of Boolean, and including a value which sets forth, as a Boolean, that the login credentials are acceptable). With reference to that which is discussed hereinabove, the processing logic may in constructing the credential acceptability variable tuple establish a corresponding local variable.

Having formulated the one or more authentication replies, the processing logic may, at block 409, send the authentication replies to the virtualization management platform. The sending operation may involve the processing logic and the virtualization management platform employing an encrypted channel and/or various inter-process communication methods.

Figure 5:
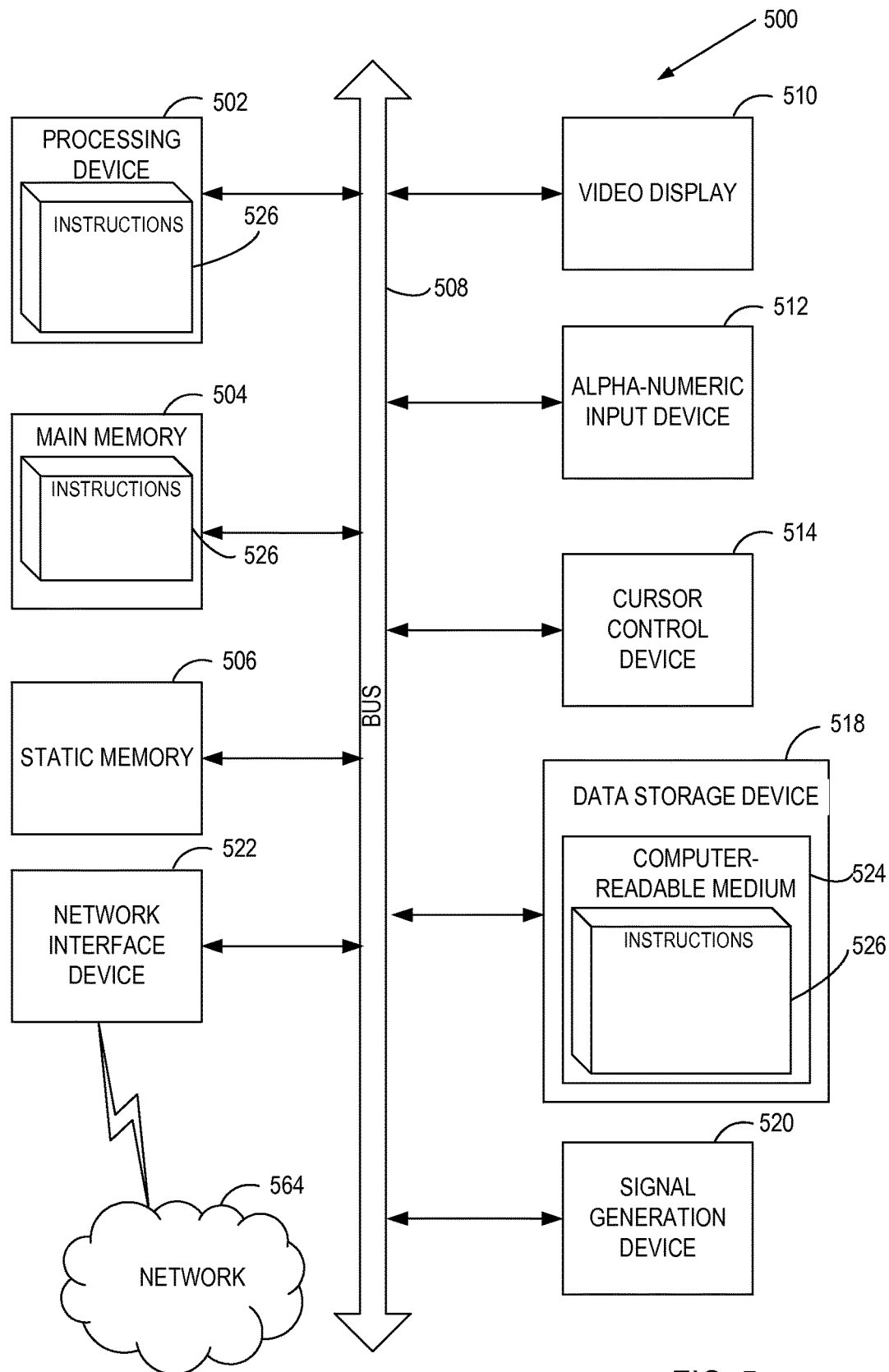
FIG. 5 depicts a block diagram of an example computer system operating in accordance with one or more aspects of the present disclosure.

FIG. 5 illustrates a diagrammatic representation of a machine in the example form of a computing device 500 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 508.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 526) for performing the operations and steps discussed herein.

The computing device 500 may further include a network interface device 522. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504, within the static memory 506 and/or within the processing device 502 during execution thereof by the computer system 500, the main memory 504, static memory 506 and the processing device 502 also constituting computer-readable storage media.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner. It is to be understood that the above description is intended to be illustrative, and not restrictive. Many other implementations will be apparent upon reading and understanding the above description. Although implementations of the present disclosure have been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   receiving, by a processing device of a virtualization management platform, a request initiated by a requestor for access to an enterprise virtualization portal associated with the virtualization management platform, the request comprising a login credential and a requested type of portal access;
   transmitting, by the processing device, to a first authentication system, a first authentication query comprising a first value derived from the login credential and a second value derived from the type of portal access;
   receiving, from the first authentication system, a first authentication response;
   transmitting a second authentication query to a second authentication system in response to determining that the first response message indicates a successful user authentication, wherein the second authentication query comprises a third value derived from the login credential and a fourth value derived from the type of portal access, wherein the first authentication system and the second authentication system implement at least one of: OpenID authentication, Keystone authentication, Lightweight Directory Access Protocol (LDAP) authentication, or a custom authentication;
   receiving, from the second authentication system, a second authentication response;
   performing a run-time binding between the virtualization management platform and at least one of: the first authentication system or the second authentication system; and
   responsive granting the requestor access to the enterprise virtualization portal of the requested type in response to evaluating the second authentication response, wherein the first value, the second value, the third value and the fourth value are numeric values, alphanumeric values, or string values.

2. The method of claim 1, further comprising:
   configuring the enterprise virtualization portal for performing chain authentication by the first authentication system and the second authentication system.

3. The method of claim 1, wherein the first authentication system and the second authentication system implement different authentication methods.

4. The method of claim 1, wherein the requested type of portal access is represented by one of: an administrator portal access or a user portal access.

5. The method of claim 1, further comprising:
   responsive to determining that the first response message indicates a unsuccessful user authentication, denying the requestor access to the enterprise virtualization portal.

6. A system comprising: a memory; and
   a processing device, operatively coupled to the memory, to:
   receive a request initiated by a requestor for access to an enterprise virtualization portal, the request comprising a login credential and a requested type of portal access;
   transmit, to a first authentication system, a first authentication query comprising a first value derived from the login credential and a second value derived from the type of portal access;
   receive, from the first authentication system a first authentication response;
   transmit a second authentication query to a second authentication system in response to determining that the first response message indicates a successful user authentication, wherein the second authentication query comprises a third value derived from the login credential and a fourth value derived from the type of portal access, wherein the first authentication system and the second authentication system implement at least one of: OpenID authentication, Keystone authentication, Lightweight Directory Access Protocol (LDAP) authentication, or a custom authentication;

receive, from the second authentication system, a second authentication response;

perform a run-time binding between the virtualization management platform and at least one of: the first authentication system or the second authentication system; and responsive to evaluating the second authentication response, grant the requestor access to the enterprise virtualization portal of the requested type wherein the first value, the second value, the third value and the fourth value are numeric values, alphanumeric values, or string values.

7. The system of claim 6, wherein the processing device is further to:

configure the enterprise virtualization portal for performing chain authentication by the first authentication system and the second authentication system.

8. The system of claim 6, wherein the first authentication system and the second authentication system implement different authentication methods.

9. The system of claim 6, wherein the requested type of portal access is represented by one of: an administrator portal access or a user portal access.

10. The system of claim 6, wherein the processing device is further to:

responsive to determining that the first response message indicates a unsuccessful user authentication, deny the requestor access to the enterprise virtualization portal.

11. A computer-readable non-transitory storage medium comprising executable instructions that, when executed by a processing device, cause the processing device to:

receive, by the processing device, a request initiated by a requestor for access to an enterprise virtualization portal associated with the virtualization management platform, the request comprising a login credential and a requested type of portal access;

transmit, to a first authentication system, a first authentication query comprising a first the first value derived from the login credential and a second value derived from the type of portal access;

receive, from the first authentication system a first authentication response;

transmit a second authentication query to a second authentication system in response to determining that the first response message indicates a successful user authentication, wherein the second authentication query comprises a third value derived from the login credential and a fourth value derived from the type of portal access, wherein the first authentication system and the second authentication system implement at least one of: OpenID authentication, Keystone authentication, Lightweight Directory Access Protocol (LDAP) authentication, or a custom authentication;

receive, from the second authentication system, a second authentication response;

perform a run-time binding between the virtualization management platform and at least one of: the first authentication system or the second authentication system;

and grant the requestor access to the enterprise virtualization portal of the requested type in response to evaluating the second authentication response, wherein the first value, the second value, the third value and the fourth value are numeric values, alphanumeric values, or string values.

12. The computer-readable non-transitory storage medium of claim 11, further comprising executable instructions causing the processing device to:

configure the enterprise virtualization portal for performing chain authentication by the first authentication system and the second authentication system.

13. The computer-readable non-transitory storage medium of claim 11, wherein the first authentication system and the second authentication system implement different authentication methods.

14. The computer-readable non-transitory storage medium of claim 11, wherein the requested type of portal access is represented by one of: an administrator portal access or a user portal access.

* * * * *